United States Patent [19]

Bishop et al.

[11] Patent Number: 5,568,497
[45] Date of Patent: Oct. 22, 1996

[54] CHALCOGENIDE OPTICAL PUMPING SYSTEM HAVING BROAD EMISSION BAND

[75] Inventors: Stephen G. Bishop, Champaign; Shiqun Gu; Douglas A. Turnbull, both of Urbana, all of Ill.

[73] Assignee: The Board of Trustees of the University of Illinois, Ill.

[21] Appl. No.: 487,180

[22] Filed: Jun. 7, 1995

[51] Int. Cl.⁶ .................................................. H01S 3/10
[52] U.S. Cl. ......................................... 372/40; 372/6
[58] Field of Search .................................. 372/40, 39, 6; 501/40

[56] References Cited

U.S. PATENT DOCUMENTS

| | | |
|---|---|---|
| 5,136,677 | 8/1992 | Drexhage et al. . |
| 5,299,210 | 3/1994 | Snitzer et al. . |
| 5,309,452 | 4/1994 | Ohishi et al. ............... 372/6 |
| 5,321,708 | 6/1994 | Tohmon et al. . |
| 5,378,664 | 6/1995 | Becker et al. ............... 501/40 |
| 5,392,376 | 2/1995 | Aitken et al. . |

OTHER PUBLICATIONS

Gain Flatness Comparison Between Erbium-Doped Flouride and Silica Fiber Amplifiers with Wavelength-Multi-plexedSignals, B. Clesca, B. Ronarc'h, D. Bayart, Y. Sorel, L. Hamon, M. Guilbert, J. L. Beylat, J. F. Kerdiles and M. Semenkoff, IEEE Photonics Technology Letters, vol. 6, No. 4, Apr. 1994.

Iron impurities as non-radiative recombination centres in chalcogenide glasses, S. G. Bishop and P. C. Taylor, Philosophical Magazine B, 1979, vol. 40, No. 6, 483–495 Optical Characterization or Er:As₂S₃Glass, Conference on Lasers and Electro Optics (CLEO), May 8, 1994, p. 336.
Photoluminescence and Excitation Spectroscopy in Er:As₂S₃Glass, S. Q. Gu, Q. Xu, E. E. Reuter, J. T. Verdeyen, and S. G. Bishop, IEEE Lasers and Electro-Optics Society 1993 Annual Meeting, (LEOS), Nov. 15–18, 1993.

Primary Examiner—Leon Scott, Jr.
Attorney, Agent, or Firm—Greer, Burns & Crain, Ltd.

[57] ABSTRACT

The present invention concerns an optical pumping system using a broad continuous chalcogenide emission band of approximately 190 nm in width. The broad emission band is induced by the rare earth doping of a chalcogenide glass. Co-doping using Pr and Er produces a photoluminescence band extending from approximately 1510 nm to 1700 nm. Alternatively, separately Pr and Er doped samples exhibit emission bands considerably wider then the characteristic Pr(1620 nm) and Er (1550 nm) emission bands typically realized in doped oxide glasses. According to the present invention these broad bands are used to produce optical gain over the continuous broad 190 nm band. An excitation source subjects the glass to pumping light to stimulate the broad band emissions. Applied to an optical amplifier, optical signals entering the chalcogenide glass anywhere within the broad range will be amplified. Gain throughout the broad spectrum may be tailored by altering the respective rare earth dopant concentrations or intensity of separate pumping light from the excitation source.

22 Claims, 3 Drawing Sheets

CHALCOGENIDE OPTICAL PUMPING SYSTEM HAVING BROAD EMISSION BAND

This invention was made with Government support under Contract No. ECR 89-43166 awarded by the National Science Foundation. The Government has certain rights in the invention.

The present invention relates generally to an optical pumping system utilizing a broad photoluminescence emission band. More specifically, the present invention concerns a pumping system in which light from an excitation source is absorbed by a rare earth doped chalcogenide glass band to excite photoluminescence emissions over a broad continuous band. Commonly invented and assigned application entitled CHALCOGENIDE OPTICAL PUMPING SYSTEM DRIVEN BY BROAD ABSORPTION BAND, Ser. No. 08/435,353, filed May 5, 1995 is incorporated by reference herein. The absorption pumping features of that invention may be advantageously used in conjunction with the present invention.

BACKGROUND OF THE INVENTION

Transmission of electrical and optical signals may be effectively used to communicate information. Microwave signals are electromagnetic emissions transmitted through the air to carry audio and visual information over distance. Similarly, electrical signals may be transmitted over cables, as is done in telephone systems and cable television systems.

Recently, in communications systems, such as telephone systems, emphasis has turned toward use of optical signals and away from use of electrical signals. In modern times, telephone companies implemented optical fiber communication systems. In the home electronics industry phonographs have been replaced with compact disk players, which rely upon laser light reflections to read information from a disk.

Practical reasons exist for the shift in focus to optically driven systems. Unlike electrical signals, optical signals are generally unaffected by electromagnetic fields created by such things as power lines, lightning and even sunspots. These sources of interference may create noise in electrical signals. Noise may appear, for instance, as static in an audio signal or distortion in a visual signal. Thus, while such electromagnetic fields create noise in an electrical communication system, an optical system retains its original qualities in the presence of the electromagnetic fields.

Information capacity of optical signals is also much larger than lower frequency electrical signals that are used in wire and wireless communication systems. Generally, higher frequency signal carriers provide larger information capacity than lower frequency signal carriers. This is due to the wider bandwidth of the higher frequency signals.

Larger information capacity and noise immunity are great benefits, but another important benefit of communicating with optical signals is the small size of optical fibers used as a transmission medium. A typical fiber having hair sized dimensions is a suitable replacement for bundles of copper wires having much larger diameter. As demands for information access become larger and larger in modern times, the use of optical transmission systems places less demand on space in the construction of underground, above ground, and internal building communication systems.

Common difficulties are encountered in the practical implementation of optical communication systems, however. Ideally, the basic elements of a communication system include a transmitter, a transmission medium, and a receiver. Input signals, typically electric signals, are input to an optical transmitter. Conversion of the input signal to an optical signal is conducted within the transmitter and a light source, such as a semiconductor laser, pumps light into the optical transmission medium. The transmission medium usually takes the form of an optical fiber. Reception and conversion of the optical signal is accomplished in a receiver coupled to the optical fiber at some distance away from the transmitter. A basic receiver will include a light detector for detecting the optical signal and converting the same to an electrical signal, an amplifier for amplifying the electrical signal, and signal reproducer for outputting the original input signal as an electrical signal.

In practice, additional elements are required since signal losses occur over distance in the optical fiber. Losses limit the distance by which the transmitter and receiver may be separated. These losses are generally referred to as optical signal attenuation. Absorption of signal light by the fiber acting as the transmission medium is one factor causing attenuation. Other factors leading to attenuation are the scattering of the signal light over a wider wavelength than the original transmission and radiative losses, typically occurring at bends in the optical fiber. Combination of these individual losses leads to a total signal attenuation characteristic for a particular optical transmission medium which is measured in decibels per kilometer.

In order to implement practical systems, taking into consideration the optical attenuation characteristic of the particular optical fiber being used, it is therefore necessary to periodically amplify the signal as it travels over distance. Repeater stations are used to accomplish this amplification and are an integral part of modern optical communication systems. Typical repeater stations include both a receiver and transmitter which decode the optical signal, convert it to an electrical signal, reconvert to an optical signal and transmit the optical signal toward the next repeater or receiver station.

Repeater stations contribute significantly to the cost of optical communication systems, commonly costing tens of thousands of dollars. Moreover, repeater stations are provided in redundant pairs or larger numbers of repeaters, since a repeater may fail. Additionally, the repeater stations are often installed in inconvenient locations, such as the ocean floor, that makes replacement and initial installation difficult and expensive.

A simpler manner of implementing repeater stations involves use of optical amplifiers. The general structure of an optical amplifier is detailed in U.S. Pat. No. 5,309,452 to Ohishi et al., which is hereby incorporated by reference. In an optical amplifier, the signal light is amplified in optical form without conversion to an electrical signal. Amplification is accomplished by the signal stimulating additional emission as it passes through the optical amplifier. Of course, the optical amplifier has other applications, including implementation at the transmission end of an optical communication system to create stronger optical signals that may travel further in a fiber having given attenuation characteristics.

Optical amplification is attributable to what is referred to as stimulated emission. A rare-earth-doped glass (usually optical fiber) is pumped at a wavelength which is absorbed by the rare earth ions placing them in an excited state. The rare earths can relax to the ground state by emitting characteristic longer wavelength photons (compared to the pump light) in a process called spontaneous emission. If the pumping intensity is sufficiently high, the rate of excitation can exceed the spontaneous decay rate and a population inversion is obtained. When pulses of signal light having photon wavelength within the spontaneous emission band of the inverted population of excited rare earth ions enter the amplifier, they stimulate the emission of additional photons of identical wavelength, phase and propagation direction (stimulated emission). These additional photons imparted to the signal are responsible for the gain of the optical amplifier.

Traditionally, the optical amplifiers and transmission media have been formed with oxide glasses. A widely applied amplifier using oxide glass is the Erbium doped fiber amplifier (EDFA). More recently, chalcogenide glasses have been investigated as hosts since these glasses have good infrared wavelength transparency, are durable, are easy to prepare in bulk or thin film form, can form optical fibers, and may be formed as patterned waveguides by photodarkening processes. The ability to create chalcogenide thin films, by sputtering, for instance, allows for formation of a device using a chalcogenide glass as part of a larger semi-conductor integrated package.

Typical EDFA's rely exclusively upon the pumping absorption and emission characteristics attributable to the dopant, i.e. Erbium (Er). Effective absorption of light from the excitation source by the EDFA requires that the excitation light correspond to narrow characteristic absorption bands of the Erbium dopant. Incident light in these bands will excite electrons of Erbium ions within the glass to higher energy levels, and photons are released to provide luminescence when the electrons return to the normal state. Typical amplifiers rely upon and are limited to use of the luminescence bands attributable to the radiative transitions of the dopant. Co-doped amplifiers have also been used incorporating Er with Yb, wherein Yb enhances the absorption and subsequently transfers its energy to the emitting Er. Pr is an additional element used as a dopant.

Reliance upon dopant radiative transition emission characteristics for light output results in pumping systems having narrow output emission bands. In the art, the commonly employed emission bands are the 1340 nm Pr band and the 1550 nm Er band. These bands are fairly narrow. For instance, a typical EDFA has an approximately 30 nm wide 1550 nm emission band. Similar result is reached by employing the 1340 nm Pr band.

In the case where an EDFA is used as part of a communication system, the narrow band limits information capacity. A fiber link may carry a number of distinct signals operating at different wavelengths. However, a given separation on the wavelength spectrum is necessary to avoid "cross-talk" between the signals resulting from attenuation as well as the ability of a receiver to distinguish among signals at closely spaced wavelengths. Expansion of the emission band directly relates to expansion of the number of optical channels which may be supported.

Another difficulty associated with narrow bandwidth relates to multi-stage pumping systems. In such a system, a number of amplifiers, such as EDFA's may be cascaded. For the system to be useful, the gain profile over the bandwidth of the amplifiers must be uniform. While such uniformity is important in a single stage amplifier, it becomes critical in a cascaded arrangement since any non-uniformity in gain across bandwidth will be magnified with each successive stage of amplification.

Other applications utilizing pumping systems also encounter difficulties associated with narrow and non-uniform emission bands. Generally, the problems associated with communication applications of relatively narrow band pumping systems also apply to other devices, such as lasers. Pumping relying upon a narrow rare earth dopant absorption band is limited by the weak oscillator strength of the rare earth absorption. In addition, a pumping source, such as a laser, of a specific wavelength is required. Additional flexibility should be provided in the implementation of a pumping source through use of the pumping system in related application no. 08/435,353 (CHALCOGENIDE OPTICAL PUMPING SYSTEM DRIVEN BY BROAD ABSORPTION BAND, Bishop et al.), which uses a continuous broad absorption band of approximately 400 nm in width.

In sum, there is a need for an improved optical pumping system having a broad and continuous photoluminescence emission band providing great flexibility in the application of the pumping system to optical amplifiers, communication systems, lasers and other devices. Good oscillator strength should be provided, and the pumping system should allow for controlled gain across the broad emission band.

It is therefore an object of the present invention to provide an improved optical pumping system that uses a photoluminescence emission band extending beyond characteristic dopant emission transitions.

An additional object of the present invention is to provide an improved optical pumping system utilizing a continuous optical emissions band of approximately 190 nm in width.

Another object of the present invention is to provide an improved optical pumping system responsive to excitation pumping light over a continuous broad absorption range of approximately 400 nm and which produces optical emission over a continuous emission band of approximately 190 nm in width.

Still another object of the present invention is to provide an improved optical pumping system which can provide photoluminescence emissions over a continuous emission band of approximately 190 nm in width and utilize excitation sources, such as light emitting diodes and simple semiconductor lasers, that supply pumping light over a broader spectrum than finely tuned and expensive laser sources.

An additional object of the invention is to provide an improved optical pumping system having a chalcogenide glass doped with a rare earth, and which absorbs excitation light from an excitation source over an approximate wavelength band of 600–1064 nm and produces photoluminescence emissions in response thereto over an approximate wavelength band of 1510 nm–1700 nm.

A still further object of the present invention is to provide an improved optical pumping system having a chalcogenide glass doped with a rare earth responsive to an excitation source, the glass having a broad absorption band and responsive emission band, and being suitable for thin film deposition in an integrated circuit including the excitation source.

Yet another object of the present invention is to provide an improved optical pumping system having a chalcogenide glass co-doped with Erbium and Praseodymium, the chalcogenide glass absorbing pumping light from an excitation source over a broad absorption band of approximately 400 nm in width, and producing photoluminescence emissions in response thereto over an approximate wavelength band of 1510 nm–1700 nm.

A still additional object of the present invention is to provide an improved optical pumping system having a rare earth doped chalcogenide glass in which electrons are excited to a higher energy level in response to excitation source light over a broad absorption range of approximately 400 nm in width, the electrons having higher energy level occupancy lifetimes in the approximate range of 0.25 ms (Praseodymium) to 2 ms (Erbium), and producing optical emission over a continuous broad range of approximately 190 nm in width.

SUMMARY OF THE INVENTION

The present invention concerns an improved optical pumping system using a broad continuous emission band of approximately 190 nm in width. According to the present invention a rare earth doped chalcogenide glass is subjected to pumping light from an excitation source and the glass emits photoluminescence in response thereto over a continuous broad range of approximately 190 nm in width. Co-doping of a chalcogenide glass, such as $As_{12}Ge_{33}Se_{55}$, using Erbium and Praseodymium may be utilized in accordance with the present invention to obtain an emission band extending from approximately 1510–1700 nm. Other host chalcogenide glasses may produce similar results.

Applied in a communication system, the present invention may serve as an optical amplifier having a broad band gain and capacity for numerous discrete channels. Control of gain across the broad band may be advantageously realized by tailoring relative doping concentrations of Pr and Er in accordance with an aspect of the present invention. To accomplish a similar effect, multiple excitation sources tuned to peak absorption bands of the rare earth dopants may be intensity adjusted to have a corresponding effect of the emission band of the amplifier.

Another aspect of the invention relates to the implementation of an optical pumping system having a rare earth doped chalcogenide glass combined onto an integrated circuit with an excitation source which emits broad band photoluminescence with an approximate bandwidth of 190 nm in response to pumping light over a broad continuous absorption band. Preferably the chalcogenide glass is formed as a thin film by standard techniques such as sputtering or thermals evaporation. The rare earth dopants are introduced in the sputtering target or in the source material for evaporation.

Good electron radiative lifetimes are realized through the present invention. Electrons within the chalcogenide glass excited through broad band absorption of pumping light remain in an excited state for an approximate time of 0.25 for Praseodymium to 2 ms in Erbium for concentrations up to 0.2 wt. %.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE INVENTION

Broadly stated, the present invention provides an improved optical pumping system making use of a continuous broad photoluminescence or emission band of a rare earth doped chalcogenide glass. The chalcogenide glass incorporated into an optical pumping system in accordance with the present invention produces optical emission throughout a continuous emission range as large as approximately 190 nm in width. The broad band emissions may be induced by subjecting the chalcogenide glass to pumping light anywhere within a broad absorption band extending from 600 nm to approximately 1064 nm. Excellent oscillator strength and information capacity is encompassed within the broad emission band of the present invention.

Figure 1:
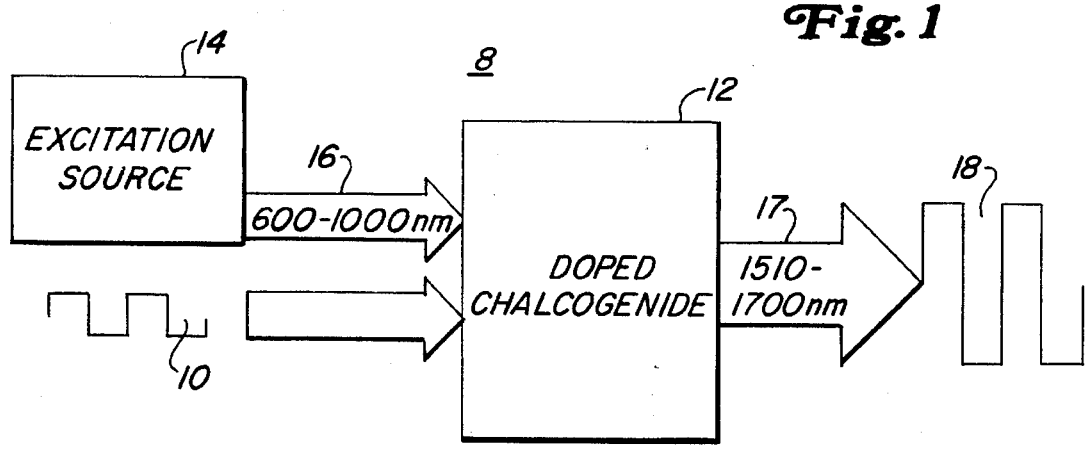
FIG. 1 is a block diagram showing an optical pumping system (usable as an optical amplifier) constructed in accordance with the present invention.

Referring now to FIG. 1, shown is a basic optical pumping system 8 in accordance with the present invention. An optical signal 10 carrying information is directed into a rare earth doped chalcogenide glass 14. Optical signal 10 may originate from a transmitter, for instance, and may have travelled some distance from the transmitter through a transmission medium, an example of which is an optical fiber.

As is well understood in the art, as the optical signal 10 travels through a transmission medium signal losses referred to as attenuation, may occur. Eventually, the losses reach a level wherein the information carried by the optical signal may no longer be discernable by an optical receiver intended to decode the signal. Alternatively, the optical signal may be emitted from a relatively weak transmitter in which case it is desirable to amplify the signal even before the signal has been transmitted over distance.

In either situation, and other situations, it is desirable to amplify the optical signal 10. Addressing this goal, the optical signal 10 to be amplified is directed into the rare earth doped chalcogenide glass 14, which may be in fiber or thin-film form. Any suitable coupling or light guide may be used to direct the optical signal 10 into the chalcogenide glass 14. Also directed into the chalcogenide glass 14, from an excitation source 16, is excitation (pumping) light 16. Advantageously, optical signals 10 falling within a broad emission spectrum 17 from 1510 nm to 1700 nm of the doped chalcogenide glass 12 will be amplified.

The specific mechanism inducing the amplification occurs when pumping light 16 is directed into the chalcogenide glass anywhere within an approximate continuous wavelength band from 600 to 1064 nm and is absorbed by the glass. This broad absorption mechanism excites rare earth dopant atoms into higher energy levels over a continuous broad emission spectrum 17. Spontaneous radiative lifetimes of the excited electrons will generally be those characteristic to the rare earth dopant emissions bands. When the rate of excitation (pumping) exceeds the spontaneous emissions rate, a population inversion is achieved. Incident photons (the optical signal) at the emission wavelength can then stimulate additional photons of identical wavelength and phase (stimulated emission) effecting an amplification of the optical signal. Thus, amplified signals 18 over the continuous broad emission spectrum 17 propagate from the chalcogenide glass 12 and may be directed into a transmission medium, a receiver, an additional pumping system or other useful device.

According to the present invention, optical emissions are induced over the broad continuous range from 1510 nm to 1700 nm. For this reason, signals falling outside the relatively narrow characteristic emission bands of the rare earth dopants may be amplified. Generally, the 1550 nm emission band attributable to the $^4I_{13/2} \rightarrow {}^4I_{15/2}$ Er radiative transition is only approximately 30 nm in width. The Pr characteristic 1340 nm and 1064 nm transitions exhibits a similar narrow band.

Figure 2:
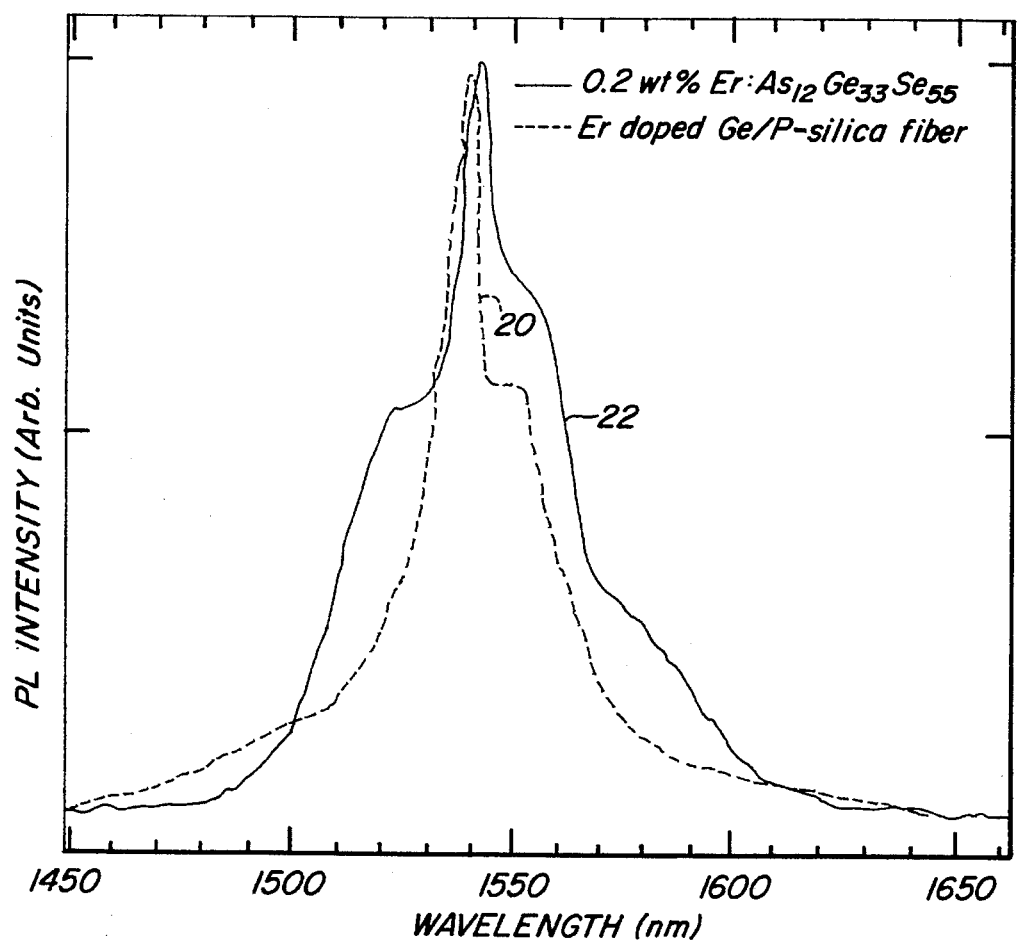
FIG. 2 is a room temperature plot of the photoluminescence (PL) spectrum obtained from a 0.2% wt. % $Er:Ge_{33}As_{12}Se_{55}$ sample subjected to 700 nm pumping light from a Ti doped sapphire laser compared to PL from an Er doped Ge/P—silica fiber.

A broad band emission chalcogenide Er mechanism utilized in the present invention is illustrated in FIG. 2. Shown in FIG. 2 is a room temperature plot of photoluminescence (PL) spectrum obtained from a 0.2% wt. % $Er:Ge_{33}As_{12}Se_{55}$ sample subjected to 700 nm pumping light from a Ti doped sapphire laser compared to PL emissions from an Er doped Be/P—silica fiber. In the oxide glass, the emissions are attributable to the characteristic Er band, as tracked by the curve 20. The Er doped chalcogenide sample exhibits a significantly broader emission band than those observed for ER in oxide glasses, as tracked by the curve 22.

Figure 3:
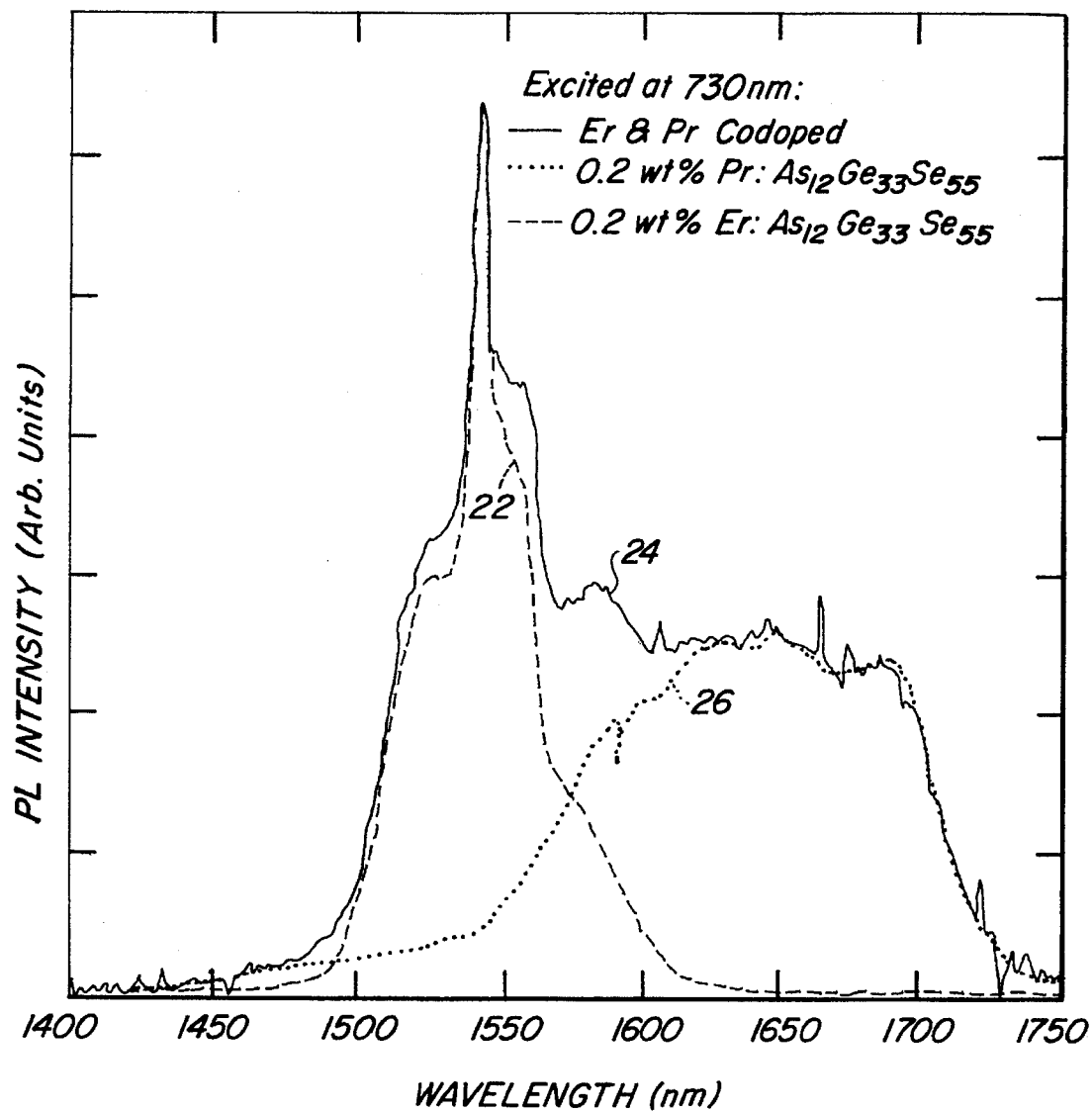
FIG. 3 shows a PL spectrum for a 0.2 wt. % Er and Pr co-doped sample excited by 730 nm pumping light along with the separate components individually attributable to Er and Pr in the chalcogenide host.

Further broadening of the emission spectrum is realized by the co-doping of the chalcogenide glass with Er and Pr, as illustrated in FIG. 3. FIG. 3 shows a PL spectrum for a 0.2 wt. % Er and Pr co-doped sample excited by 730 nm pumping light along with the separate components individually attributable to Er and Pr in the chalcogenide host.

The curve 24 exhibits the broad approximately 190 nm continuous emission band which is advantageously utilized in the pumping system 8 according to the present invention. This curve 24 results from separate Er and Pr chalcogenide emission interactions as traced by the Er curve (from FIG. 2) and a Pr curve 26. Although the data obtained in FIG. 2 resulted from excitation of the chalcogenide glass to pumping light at 700 nm, the doped glass is highly absorbent throughout wide band from approximately 600 nm to 1064 nm.

Figure 4:
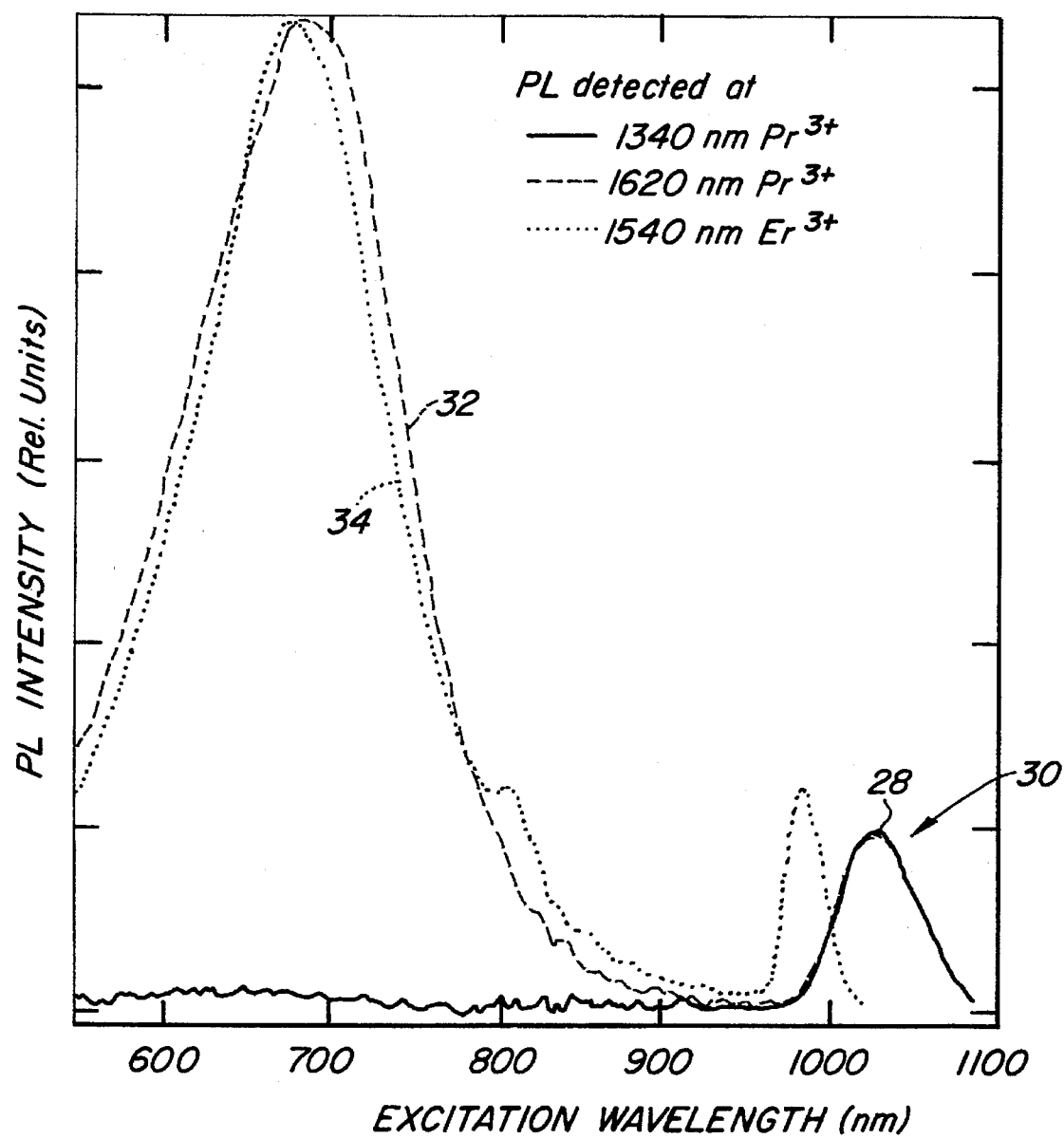
FIG. 4 is a plot of room temperature PLE spectra for 0.2 wt % $Pr:As_{12}Ge_{33}Se_{55}$ and $Er:As_{12}Ge_{33}Se_{55}$ samples excited over a range of wavelengths with pumping light provided by a tungsten lamp dispersed by a 0.25 m double grating monochromator. The PLE spectra were detected at the wavelength shown in the insert to FIG. 4.

Examination of the photoluminescence excitation spectra for separately doped $As_{12}Ge_{33}Se_{55}$ glasses reveals that the commonly used 1340 nm emission band is not efficiently excited by the 600–1064 nm absorption band. FIG. 4 is a plot of room temperature PLE spectra for 0.2 wt % $Pr:As_{12}Ge_{33}Se_{55}$ and $Er:As_{12}Ge_{33}Se_{55}$ samples excited over a range of wavelengths with pumping light provided by a tungsten lamp dispersed by a 0.25 m double grating monochromator. As seen in FIG. 4, a curve 28 tracking 1340 nm emission in a Pr doped sample over a broad range of excitation wavelengths reveals that the Pr emission band is dominated by the characteristic 1064 nm Pr intra-F band absorption. This is indicated at a peak 30 of the 1340 nm Pr curve 28. However, unlike 1620 nm Pr emissions, and 1540 nm Er emissions, tracked respectively by curves 32 and 34, the 1340 nm Pr emission curve 28 remains relatively weak throughout the remaining portion of the 600–1064 nm absorption band of the chalcogenide glass.

While the 1340 nm peak 30 is discrete from the broad 1510–1700 nm emission band utilized in accordance with the pumping system 8 of the present invention, it may also be utilized to further expand the usable pumping range. In that case, the pumping system could be used to amplify optical signals 10 within the 1340 Pr band in addition to the broad 1510–1700 nm band. Realization of the additional amplification band simply requires that the excitation source subject an Er and Pr co-doped chalcogenide glass 12 to pumping light at 1040 nm.

The excitation source 14 may comprise more than one light producing source, such as LED's and semi-conductor lasers. The light sources may produce pumping light at separate frequencies. For example, a tunable laser could focus upon the 1040 nm band to excite 1340 nm Pr emissions, while one or more other light sources may operate within the broad 600–1064 nm absorption band of the rare earth doped chalcogenide glass 12 to excite the broad 1510 nm–1700 nm emissions 17. In that case, an additional discrete output band centered at 1340 nm would be added to the broad emission band 17. Optical signals 10 falling within the in either of the 1340 or 1510–1700 nm bands would be amplified.

Excellent control of the line shape of the 1510–1700 nm band may also be realized according to the present invention. The 1510–1700 nm emission band tracked by curve 24 in FIG. 3 includes separate Er and Pr components, represented by the curves 22 and 26. Adjusting the respective doping concentrations of the two rare earth components will vary the line shape of the curve 24 by modifying the emissions produced by the separate Er and Pr components. Production of a flatter gain profile may be accomplished by reducing the concentration of Er with respect to Pr, for instance.

Alternatively, separate pumping light supplied by the excitation source 14 may be tuned to correspond to characteristic absorption peaks of the rare earth dopants. As an example, relative intensity of discrete 980 nm (corresponding to a characteristic absorption peak of Er) and 1040 nm (corresponding to a characteristic absorption peak of Pr) pumping light from the excitation source 14 may be adjusted to flatten the lineshape of the emission curve 24. The separate Er and Pr chalcogenide emission mechanisms tracked by curves 22 and 26 contributing to the broad emission band tracked by curve 24 provide design flexibility. The flexibility may advantageously be utilized to produce a flat gain profile over the broad emission spectrum when the pumping system 8 according to the present invention is incorporated into an optical amplifier.

A multi stage optical amplifier might be implemented through cascaded arrangement of multiple pumping systems 8. In that case, maintenance of a flat gain profile over the broad emission band becomes critical since any non-uniformity in gain will be magnified with each successive stage of amplification. According to the present invention, a continuous broad amplification range from approximately 1510–1700 nm is provided along with the ability to flatten the gain profile.

Radiative lifetimes realized through the present invention are also good. In Pr doped samples electrons remain in an excited state for approximately 0.25 ms, and in Er samples electrons remain in an excited state for approximately 2 ms. In the co-doped samples, the lifetimes of the Er and Pr photoluminescence bands appear to converge somewhat. Presumably, this is attributable to inter-rare earth ion-ion interactions. The strength of these interactions should vary as a function of doping concentration.

In optical communication systems, utilization of the pumping system 8 according to the present invention will expand the number of separate frequency channels available for communication. Current optical communication systems include optical fibers and waveguides having broader wavelength capacity than is provided by the typically narrow 30 nm oxide EDFA's.

Bulk samples of the Er, Pr and co-doped chalcogenide glasses were prepared from mixtures of the major constituent elements (arsenic, sulfur, selenium, and germanium) and crystalline $Er_2S_3$. The mixtures were sealed in quartz ampoules, gradually heated (over 25 h) to 850 C. ($As_2S_3$) or 1050 C. ($Ge_{33}As_{12}Se_{55}$) rocked for 70 h, and then slowly cooled over 70 h to room temperatures using a programmable controller. Although the starting materials used in making the Er-doped glasses are of the highest purity available, the process of melting and rocking the host materials and dopants in quartz ampoules introduces impurities such as iron and oxygen which are drawn from the ampoule into the melt.

In the case of an amplifier application, additional stimulated emission may be added to optical signal 10. However, other applications will be readily apparent adopting the pumping system of the present invention. As an example, the pumping system could be used in a single stage as shown in FIG. 1, or in multiple stages. In implementation of a laser source, optical signal 10 would not be directed into the chalcogenide glass, and the signal 18 would take the form of laser output light. Moreover, the advantageous physical properties of chalcogenides, including the ability to be formed in thin film form, will allow the chalcogenide glass stage of the pumping system to be implemented as a fiber or as part of an integrated circuit including a semiconductor pump laser as an excitation source.

Thin films of the doped chalcogenide could be sputtered onto semiconductor lasers and their substrates after fabrication of the pump lasers and associated drive circuits. Additionally, waveguides may be patterned in the chalcogenide thin film through a photodarkening process. In a laser application, holographic gratings written into the waveguides by photodarkening could serve as distributed Bragg reflectors to lock the planar waveguide laser formed from the glass and pump laser at a fixed wavelength within the gain spectrum of the rare-earth doped laser.

Many other applications and advantages will be apparent to those skilled in the art. Thus, while a particular embodiment of the present invention has been described, it will be appreciated by those skilled in the art that changes and modifications may be made thereto without departing from the invention in its broader aspects and as set forth in the following claims.

What is claimed is:

1. An optical emission system comprising:
   a chalcogenide glass;
   a rare earth dopant within the chalcogenide glass;
   an excitation source for inducing a broad range of optical emissions from the chalcogenide glass, said broad range exceeding approximately 30 nm in width.

2. An optical emission system according to claim 1, wherein:
   said range is approximately 190 nm in width.

3. An optical emission system according to claim 2, wherein:
   Erbium and Praseodymium are co-dopants within said chalcogenide glass.

4. An optical emission system according to claim 3, wherein:
   at least two separate emission bands are emitted from said chalcogenide glass in response to said excitation source.

5. An optical emission system according to claim 4, wherein:
   relative intensities of said two separate emission bands are adjustable by altering the relative concentrations of Erbium and Praseodymium.

6. An optical pumping system according to claim 2, wherein:
   said range extends from approximately 1510 nm to 1700 nm.

7. An optical pumping system according to claim 6 wherein said excitation source comprises:
   at least two light sources operating at different wavelengths.

8. An optical pumping system according to claim 7, wherein
   intensity profiles of said optical emissions over said range vary in accordance with relative intensities of said two light sources.

9. An optical pumping system according to claim 8, wherein:
   said different wavelengths are 980 nm and 1040 nm.

10. An optical-pumping system according to claim 8, wherein:
    said relative intensities of said two light sources are set to produce a generally flat optical gain over said range.

11. An optical pumping system according to claim 6 wherein the chalcogenide glass produces said optical emissions in response to pumping light provided by said excitation source anywhere within a 600–1064 nm range.

12. An optical pumping system comprising:
    an optical signal generator that generates optical signals;
    an optical transmission medium receiving said optical signals and transmitting the optical signals over distance; and
    an optical amplifier disposed within the optical transmission medium at a predetermined distance from the optical signal generator, said amplifier receiving said optical signals and amplifying the signals, said amplifier including,
    a chalcogenide glass,
    a rare earth dopant within the chalcogenide glass, and
    an excitation source for adding stimulated emission to the optical signal by subjecting the chalcogenide glass to pumping light, the chalcogenide glass amplifying the optical signal over a broad range exceeding approximately 30 nm in width.

13. An optical pumping system according to claim 12 wherein:
    said chalcogenide glass and said excitation source are combined in an integrated circuit.

14. An optical pumping system according to claim 12 wherein:
    said rare earth dopant is Erbium.

15. An optical pumping system according to claim 12 wherein:
    said rare earth dopant is Praseodymium.

16. An optical pumping system according to claim 12 wherein:
    plural rare earth dopants are within the chalcogenide glass; and
    said plural rare earth dopants are Erbium and Praseodymium.

17. An optical pumping system according to claim 12 wherein:
    said range is approximately 190 nm in width.

18. An optical pumping system according to claim 17 wherein:
    said range extends from approximately 1510–1700 nm.

19. An optical pumping system according to claim 18 wherein:

the chalcogenide glass is co-doped with rare earth elements Pr and Er;

said excitation source subjects the chalcogenide glass to pumping light at least at a wavelength of 1040 nm; and the chalcogenide glass emits additional photoluminescence in a second discrete range corresponding to the characteristic 1340 nm photoluminescence emission band of Pr.

20. An optical pumping system according to claim 18 wherein said excitation source provides light at 980 nm and 1040 nm.

21. An optical pumping system according to claim 20 wherein:

said excitation source comprises two discrete light sources providing light at 980 nm and 1040 nm, and a gain profile of said optical amplifier is adjusted through changing relative intensity of said two discrete light sources.

22. An optical pumping system according to claim 12 wherein stimulated emission occurs in response to said pumping light when said pumping light is anywhere within a broad range from approximately 600 nm–1064 nm.

* * * * *